US011104220B2

(12) United States Patent
Ehler et al.

(10) Patent No.: US 11,104,220 B2
(45) Date of Patent: Aug. 31, 2021

(54) PLASTIC TANK WITH A POT-LIKE INSTALLATION BODY

(71) Applicant: TI Automotive Technology Center GmbH, Rastatt (DE)

(72) Inventors: Alex Ehler, Rastatt (DE); Albert J. Boecker, Ettlingen (DE); Patrick Gmund, Karlsruhe (DE); Peter Grauer, Steinweiler (DE); Gerrit Michaelis, Durmersheim (DE); Matthias B. Olbrich, Rastatt (DE); Ahmad Chehade, Malsch (DE); Moez Haouala, Karlsruhe (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 298 days.

(21) Appl. No.: 15/771,633

(22) PCT Filed: Oct. 26, 2016

(86) PCT No.: PCT/EP2016/075742
§ 371 (c)(1),
(2) Date: Apr. 27, 2018

(87) PCT Pub. No.: WO2017/076707
PCT Pub. Date: May 11, 2017

(65) Prior Publication Data
US 2018/0326839 A1    Nov. 15, 2018

(30) Foreign Application Priority Data
Nov. 2, 2015 (DE) .................... 10 2015 221 377.3

(51) Int. Cl.
*B60K 15/03* (2006.01)

(52) U.S. Cl.
CPC ............... *B60K 15/03177* (2013.01); *B60K 2015/03111* (2013.01); *B60K 2015/03467* (2013.01)

(58) Field of Classification Search
CPC .... B60K 15/03177; B60K 2015/03467; B60K 2015/03111; B60K 2015/03243; B60K 2015/03493; B29C 49/54; B29D 22/003
(Continued)

(56) References Cited

U.S. PATENT DOCUMENTS 4,974,570 A * 12/1990 Szwargulski ...... B01D 35/0273
123/509
5,044,526 A * 9/1991 Sasaki .................... B60K 15/06
222/377
(Continued)

FOREIGN PATENT DOCUMENTS

| DE | 10302621 A1 | 8/2003 |
| DE | 69816901 T2 | 7/2004 |

(Continued)

OTHER PUBLICATIONS

International Search Report for International Application No. PCT/EP2016/075742, dated Dec. 19, 2016, 2016, 2 pgs.
(Continued)

*Primary Examiner* — Ernesto A Grano
(74) *Attorney, Agent, or Firm* — Dickinson Wright PLLC

(57) ABSTRACT

The present disclosure relates to a plastic tank, particularly a plastic fuel tank, with a pot-like installation body arranged on the inside of the tank, as well as a method for producing the same. According to the present disclosure, a ring body is provided which is arranged on an end portion of the installation body (24), wherein the ring body is engaged in an undercut section in the tank wall, and the installation body is engaged in the ring body.

14 Claims, 3 Drawing Sheets

(58) Field of Classification Search
USPC .......................................................... 220/562
See application file for complete search history.

(56) References Cited

U.S. PATENT DOCUMENTS

| | | | | |
|---|---|---|---|---|
| 5,415,146 | A * | 5/1995 | Tuckey | B01D 35/0273 |
| | | | | 123/509 |
| 5,647,329 | A * | 7/1997 | Bucci | B01D 35/0273 |
| | | | | 123/509 |
| 5,931,353 | A * | 8/1999 | Guyomard | B60K 15/03177 |
| | | | | 220/608 |
| 6,283,731 | B1 * | 9/2001 | Yoshioka | B01D 35/0273 |
| | | | | 417/423.3 |
| 6,499,500 | B2 * | 12/2002 | Rosseel | B29C 49/54 |
| | | | | 137/15.17 |
| 6,679,399 | B2 | 1/2004 | Franjo et al. | |
| 6,923,164 | B1 * | 8/2005 | Mitsudou | F02M 37/50 |
| | | | | 123/509 |
| 7,201,151 | B2 * | 4/2007 | Hayakawa | F02M 37/103 |
| | | | | 123/509 |
| 7,886,721 | B2 * | 2/2011 | Sanden | B60K 15/077 |
| | | | | 123/509 |
| 7,980,227 | B2 | 7/2011 | Eck et al. | |
| 7,992,546 | B2 * | 8/2011 | Eck | F02M 37/50 |
| | | | | 123/509 |
| 8,240,332 | B1 * | 8/2012 | Matusek | B01D 35/027 |
| | | | | 137/565.17 |
| 9,168,830 | B2 | 10/2015 | Park | |
| 10,145,341 | B2 * | 12/2018 | Kim | F02M 37/14 |
| 2002/0000252 | A1 | 1/2002 | Rosseel | |
| 2002/0043533 | A1 | 4/2002 | Gombert et al. | |
| 2003/0141304 | A1 * | 7/2003 | Franjo | B62D 33/00 |
| | | | | 220/562 |
| 2005/0284872 | A1 | 12/2005 | Gombert et al. | |
| 2009/0308356 | A1 | 12/2009 | Eck et al. | |
| 2011/0101006 | A1 * | 5/2011 | Gardien | B60K 15/03519 |
| | | | | 220/669 |
| 2011/0139793 | A1 | 6/2011 | Park | |
| 2011/0140314 | A1 | 6/2011 | Grauer | |
| 2014/0117023 | A1 | 5/2014 | Ehler et al. | |
| 2014/0197174 | A1 | 7/2014 | Boecker et al. | |
| 2015/0367725 | A1 | 12/2015 | Parola et al. | |
| 2016/0318391 | A1 | 11/2016 | Gerhardt et al. | |

FOREIGN PATENT DOCUMENTS

| | | |
|---|---|---|
| DE | 60101113 T2 | 8/2004 |
| DE | 2013 226 295 A1 | 6/2015 |
| DE | 102013226295 A1 | 6/2015 |
| DE | 102015210412 A1 | 12/2015 |
| EP | 0203244 A1 | 5/1985 |
| EP | 0 203 244 A1 | 12/1986 |
| JP | 2012501265 A | 1/2012 |
| JP | 2014141246 A | 8/2014 |
| WO | WO2006/05117 A1 | 5/2006 |
| WO | WO 2006/051117 A1 | 5/2006 |
| WO | WO 2008/006833 A1 | 1/2008 |
| WO | WO2008/006833 A1 | 1/2008 |

OTHER PUBLICATIONS

International Preliminary Report on Patentability, International Application No. PCT/EP2016/075742, dated May 8, 2018, 7 pgs.
German Search Report dated Nov. 14, 2015.
International Search Report dated Dec. 1, 2016.
English translation of Japanese Office Action dated May 21, 2019.

* cited by examiner

PLASTIC TANK WITH A POT-LIKE INSTALLATION BODY

RELATED APPLICATIONS

This application is a 35 U.S.C. § 371 national phase application of International Application No. PCT/EP2016/075742, filed on Oct. 26, 2016, which claims the priority of German Patent Application DE 10 2015 221 377.3, filed Nov. 2, 2015, the contents of which are incorporated herein by reference in their entirety.

FIELD

The present disclosure relates to a plastic tank, particularly a plastic fuel tank, with a pot-like installation body arranged on the inside of the tank, as well as a method for installing an installation body in a plastic tank, preferably a tank module in a plastic fuel tank.

BACKGROUND

In the case of fuel tanks, the so-called tank module may be securely fastened on the tank bottom, with the tank module being an installation body that accommodates a specific fuel volume and in which a fuel pump is arranged, and so said fuel pump does not run dry even at a low fuel filling level in the tank or no pumping gaps are caused.

SUMMARY

The present disclosure provides apparatus and methods for securely fastening the installation body on the tank bottom in a safe manner and without great installation effort or extensive additional components.

For example, in order to avoid plastic welding processes during the arrangement of the installation body, a ring body, which is arranged on an end portion of the installation body, is provided according to the present disclosure, wherein the ring body is engaged in an undercut section in the tank wall, and the installation body is engaged in the ring body. The installation body is preferably designed as a tank module for receiving a fuel pump and storing a fuel volume.

The undercut section in the tank wall can be produced in a blow mold by means of sliders which act on the tank wall from outside and are movably arranged in the blow mold. Alternatively, the undercut section can be produced in the tank wall by a molded part placed in a blow mold.

Expediently, the undercut section is essentially designed so as to be circular and can consist of at least two, preferably three, separate parts.

In a preferred embodiment of the present disclosure, the ring body has outward facing retaining ribs on the side of the tank wall, the free ends of which lie on a circle prior to the engaging of the installation body in the ring body; the diameter d of said circle being smaller than the diameter D of a circle which defines the free inner diameter of the undercut section. In addition, the ring body can have a cylindrical wall section with openings, in which engaging protrusions on an outer wall section of the installation body can be engaged.

Expediently, the outer wall section of the installation body having the engaging protrusions is essentially designed so as to be cylindrical, and having a diameter which is no greater than the diameter D of the free inner diameter of the undercut section minus the thickness of the wall section of the ring body having the openings. If the above-mentioned dimensions are precisely synchronized, a secure attachment of the installation body without play on the tank wall is ensured.

The method according to the present disclosure for installing an installation body in a plastic tank, preferably a tank module in a plastic fuel tank, comprises the following steps:
Introduction of an undercut section in a tank wall on the inside of the tank;
Pre-assembly of a ring body and the installation body;
Positioning of retaining ribs of the ring body in the undercut section;
Pressing the installation body into the ring body, wherein the installation body is engaged in the ring body, and the ring body is engaged in the undercut section.

When engaging the ring body in the undercut section, a section of the ring body, which carries the retaining ribs, can be spread open, and the retaining ribs can be pressed into the undercuts of the undercut section. Furthermore, when the installation body engages in the ring body, engaging protrusions on a cylindrical wall section of the installation body, which is introduced into the ring body, can be engaged in openings in a complementary wall section of the ring body.

Preferably, the undercut section in the tank wall is produced from outside in the course of a molding of the tank in a blow mold. This can be accomplished by means of sliders arranged in the blow mold or alternatively by a molded part placed in a blow mold, around which the tank wall is formed during blow molding while creating the undercut section. While sliders in the blow mold can be reused for each new molding process, a new molded part must be provided for each new tank with said molded part remaining in the tank wall; however, in such case, the sliders in the blow mold can be omitted, and so the blow mold is designed less elaborately.

BRIEF DESCRIPTION OF THE DRAWINGS

In the following, the present disclosure is described in more detail using an embodiment schematically depicted in the drawing.

Figure 1A:
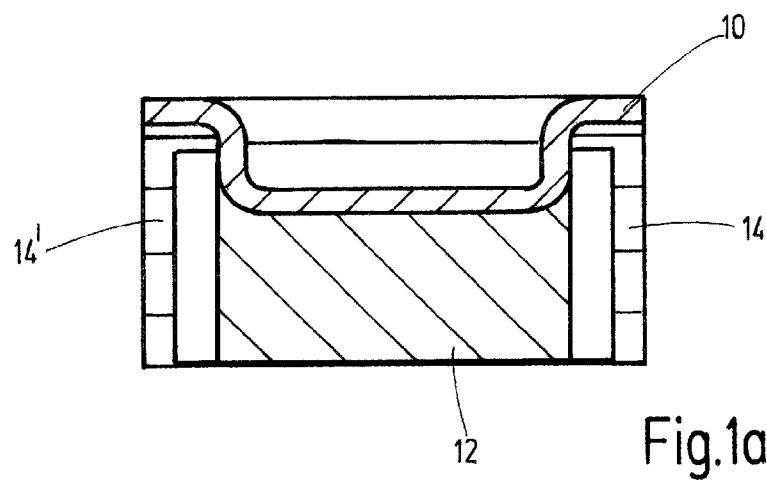
FIGS. 1a and b show a schematic depiction of the production of an undercut section by means of sliders in a blow mold.

detailed description Now, a preferred embodiment of the present disclosure will be described in conjunction with the accompanying drawings. The sizes, materials, and other specific numerical values in the following description of the embodiment are simply by way of examples for ease of understanding of the present disclosure and should not be construed to limit the present disclosure unless otherwise specified. Note that in the description and the drawings, components having substantially the same functions and configurations are designated by the same reference characters, so that their description is not repeated, while components not directly relevant to the present disclosure are not shown.

Figure 1B:
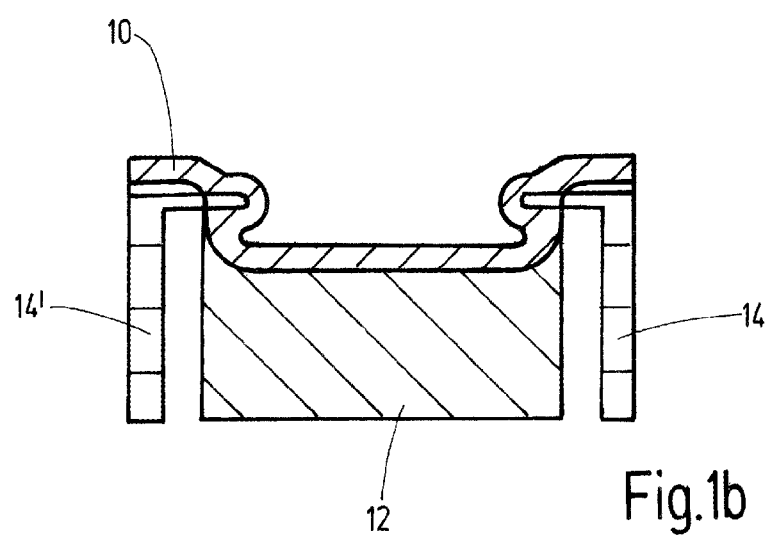

FIG. 1 shows in a simplified manner the production of an undercut section in a tank wall 10 of a plastic tank, which is otherwise not depicted in more detail, in a blow mold 12. The tank wall 10 is molded in a slightly recessed, approximately circular area of the blow mold 12 (FIG. 1a), and so sliders 14, 14', which are arranged laterally relative to the recessed area, can be moved toward one another (FIG. 1b) and thereby mold the flowably heated material of the tank wall 10 at a specific distance from the bottom of the recessed area, thus forming the undercut section. It is conceivable that more than two sliders are used which are arranged at equal or unequal circumferential distances on a circle and each mold a circular segment-shaped area of the undercut section.

Figure 2:
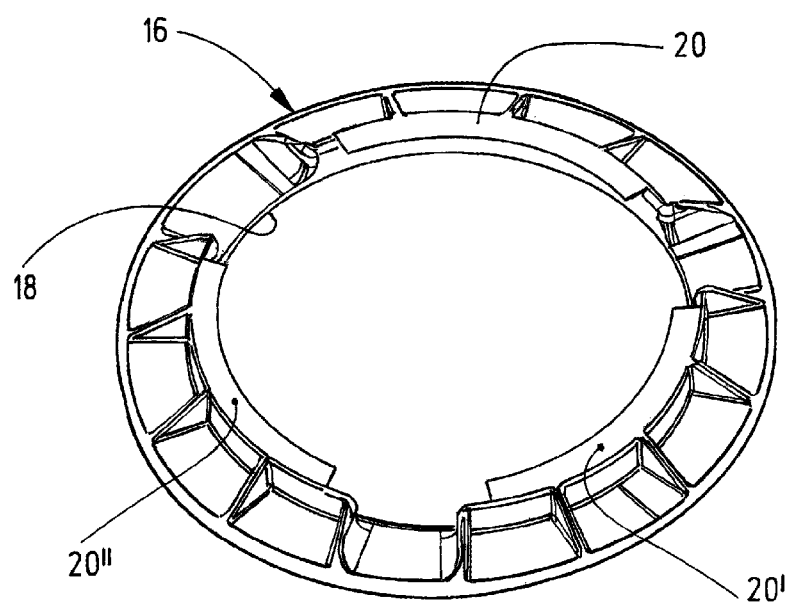
FIG. 2 shows a perspective view of a molded part for producing an undercut section in a blow mold, wherein the molded part is placed in the blow mold and acts on the tank wall from outside.

Alternatively, the molded part 16 shown in FIG. 2 can be used for producing the undercut section. The molded part is annular with a central opening 18 which defines the diameter of the undercut section. Prior to the blow molding process, the molded part 16 is placed in the blow mold in the position, in which the undercut section is supposed to be created. When the tank wall is molded, the molded part 16 is located between the blow mold and the outer side of the tank wall. At a distance from an imaginary base plane, the molded part 16 has three inward facing, pitch-circular ribs 20, 20', 20" which are engulfed by the material of the tank wall, and which form three corresponding undercut parts on the inner side of the tank wall (cf. FIG. 3). After the blow molding, the molded part is largely molded into the tank wall and thus remains on the tank; it is therefore a non-reusable lost part.

Figure 3:
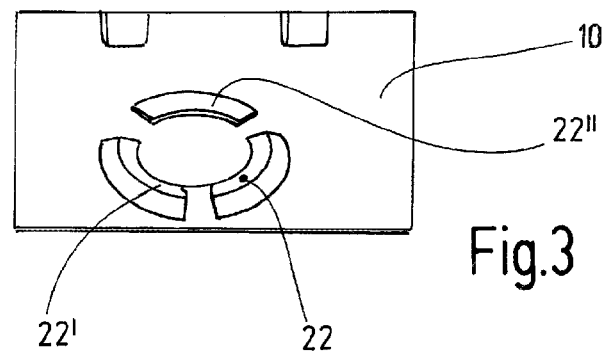
FIG. 3 shows a schematic view of an undercut section on the inner side of a tank wall.

FIG. 3 shows a view of the inner wall of the tank with the undercut section formed by the three undercut parts 22, 22', 22", which can be formed by means of one of the two methods described above.

Figure 4:
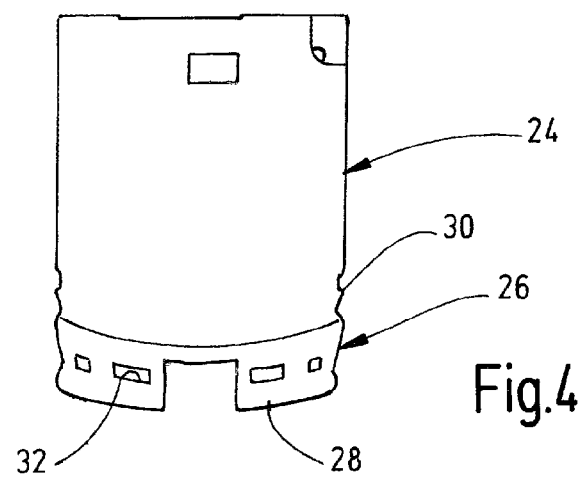
FIG. 4 shows a schematic view of an installation body and a ring body in a preassembled state.
Figure 5:
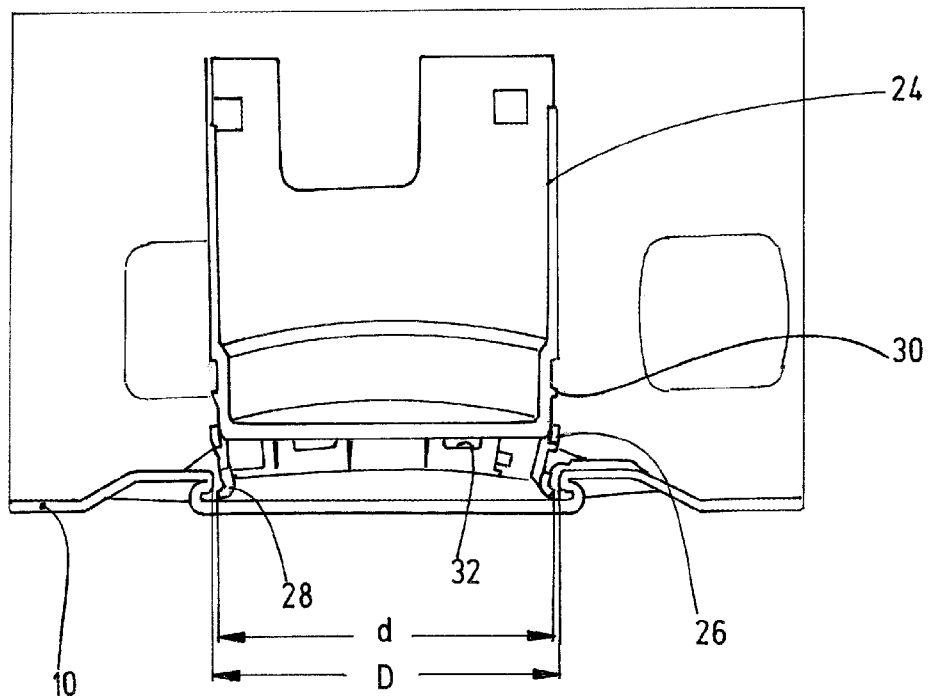
FIG. 5 shows the positioning of the installation body and the ring body according to FIG. 4 in the undercut section prior to the final assembly.

FIG. 4 shows an installation body 24, which is designed as a tank module, and a ring body 26. The installation body 24 and the ring body 26 are in a preassembled or partially assembled state, in which a section of the installation body 24 on the bottom side is inserted to some extent in a space formed in the interior of the ring, and the two parts are held together at most in a frictionally engaged manner. In the area of its free or bottom-side end, the ring body 26 has a multiplicity of outward facing, segmented retaining ribs 28, the circumcircle of which, as can be seen, has a diameter d, which is smaller than the diameter D of an inside circle of the undercut parts 22, 22', 22", i.e. the area of the ring body 26 with the retaining ribs 28 can be inserted into the undercut section past the undercut parts 22, 22', 22" up to the tank wall, as is shown in FIG. 5. Naturally, the ring body 26 and the installation body 24 can also be installed separately and consecutively in this order in the undercut section.

Figure 6:
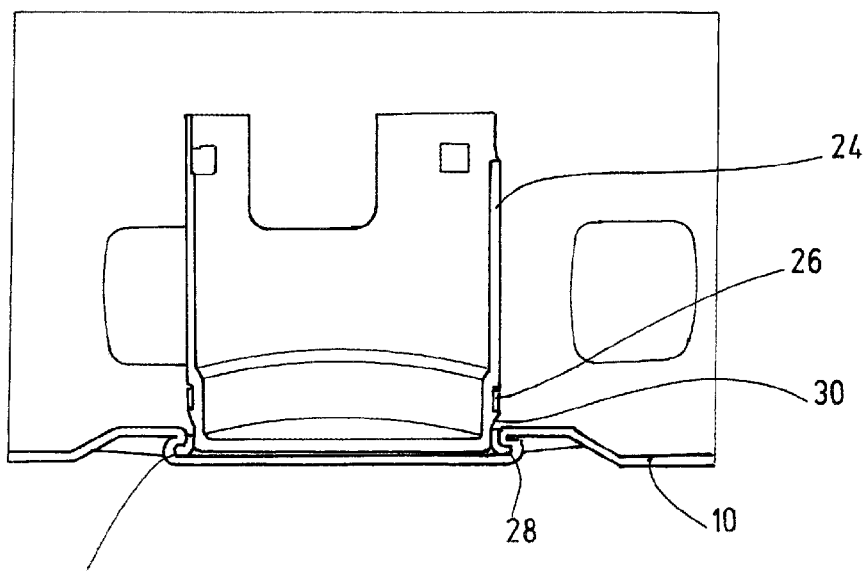
FIG. 6 shows the end position of the installation body and the ring body according to FIG. 4 after installation in the undercut section.

FIG. 5 shows the combination of installation body 26 and ring body 26 inserted in the undercut section. From this intermediate position, the installation body is pushed in the direction of the tank wall 10. As a result, the area of the retaining ribs 28 of the ring body 26 is spread open, and the retaining ribs 28 enter the undercuts. Simultaneously, engaging protrusions 30 engage on the outside of the section on the bottom side of the installation body 24 in complementary openings 32 in the cylindrical wall of the ring body 26, and so the ring body 26 is securely fastened in the undercut section, and the installation body 24 is securely fastened in the ring body, as is shown in FIG. 6. The respective dimensions of the undercut section, the ring body 26, and the installation body 24 are selected such that the installation body is installed essentially without play on the tank wall 10.

In summary, the following must be noted: the present disclosure relates to a plastic tank, particularly a plastic fuel tank, with a pot-like installation body 24 arranged on the inside of the tank, as well as a method for producing the same. According to the present disclosure, a ring body 26 is provided which is arranged on an end portion of the installation body 24, wherein the ring body 26 is engaged in an undercut section in the tank wall 10, and the installation body 24 is engaged in the ring body 26.

The invention claimed is:

1. A plastic fuel tank, with a pot-like installation body arranged on the inside of the tank, wherein a ring body is arranged on an end portion of the installation body, wherein the ring body is engaged in an undercut section in the tank wall, and the installation body is engaged in the ring body, and wherein, on a side of the tank wall, the ring body has outward facing retaining ribs, the free ends of which, prior to the engaging of the installation body in the ring body, lie on a circle having a smaller diameter d than the diameter D of a circle which defines a free inner diameter of the undercut section.

2. The plastic fuel tank according to claim 1, wherein the installation body is configured as a tank module configured for receiving a fuel pump.

3. The plastic fuel tank according to claim 1, wherein the undercut section in the tank wall is formed in a blow mold by means of sliders acting on the tank wall from the outside and movably arranged in the blow mold.

4. The plastic fuel tank according to claim 1, wherein the undercut section is configured to be substantially circular.

5. The plastic fuel tank according to claim 1, wherein the ring body has a cylindrical wall section with openings, in which engaging protrusions on an outer wall section of the installation body can be engaged.

6. The plastic fuel tank according to claim 5, wherein the outer wall section of the installation body having the engaging protrusions is configured so as to be substantially cylindrical with a diameter which is at most the diameter D of the free inner diameter of the undercut section minus the thickness of the wall section of the ring body having the openings.

7. The plastic fuel tank according to claim 1, wherein the undercut section in the tank wall is formed by a molded part placed in a blow mold.

8. The plastic fuel tank according to claim 7, wherein the undercut section consists of at least two separate portions.

9. A plastic fuel tank, with a pot-like installation body arranged on the inside of the tank, wherein a ring body is arranged on an end portion of the installation body, wherein the ring body is engaged in an undercut section in the tank wall, and the installation body is engaged in the ring body, and wherein the ring body has a cylindrical wall section with openings, in which engaging protrusions on an outer wall section of the installation body can be engaged, and wherein the outer wall section of the installation body having the engaging protrusions is configured so as to be substantially cylindrical with a diameter which is at most the diameter D of the free inner diameter of the undercut section minus the thickness of the wall section of the ring body having the openings.

10. The plastic fuel tank according to claim 9, wherein the installation body is configured as a tank module configured for receiving a fuel pump.

11. The plastic fuel tank according to claim 9, wherein the undercut section in the tank wall is formed in a blow mold by means of sliders acting on the tank wall from the outside and movably arranged in the blow mold.

12. The plastic fuel tank according to claim 9, wherein the undercut section is configured to be substantially circular.

13. The plastic fuel tank according to claim 9, wherein the undercut section in the tank wall is formed by a molded part placed in a blow mold.

14. The plastic fuel tank according to claim 13, wherein the undercut section consists of at least two separate portions.

* * * * *